(12) United States Patent
Royston

(10) Patent No.: US 12,715,520 B2
(45) Date of Patent: Aug. 25, 2026

(54) ATTACHMENT SYSTEMS FOR PULTRUDED, EXTRUDED, AND MOLDED PARTS

(71) Applicant: Zephyros, Inc., Romeo, MI (US)

(72) Inventor: Kyle Royston, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 562 days.

(21) Appl. No.: 17/424,606

(22) PCT Filed: Feb. 7, 2020

(86) PCT No.: PCT/US2020/017363
§ 371 (c)(1),
(2) Date: Jul. 21, 2021

(87) PCT Pub. No.: WO2020/163822
PCT Pub. Date: Aug. 13, 2020

(65) Prior Publication Data

US 2022/0097776 A1 Mar. 31, 2022

Related U.S. Application Data

(60) Provisional application No. 62/802,448, filed on Feb. 7, 2019.

(51) Int. Cl.
*B62D 29/00* (2006.01)
*B29C 65/48* (2006.01)
(Continued)

(52) U.S. Cl.
CPC ............ *B62D 29/002* (2013.01); *B29C 65/48* (2013.01); *E04C 3/29* (2013.01);
(Continued)

(58) Field of Classification Search
CPC . B62D 29/002; E04C 3/29; E04C 2003/0413; E04C 2003/0417;
(Continued)

(56) References Cited

U.S. PATENT DOCUMENTS 1,965,215 A * 7/1934 Boeye ................ H01M 50/262 229/125.32
2,404,126 A * 7/1946 Duddy ................ H01M 50/121 427/236
(Continued)

FOREIGN PATENT DOCUMENTS

CA 2833113 A1 5/2014
CN 201667368 U * 12/2010
(Continued)

OTHER PUBLICATIONS

PCT International Search Report & Written Opinion dated May 7, 2020, Application No. PCT/US2020/017363.
(Continued)

*Primary Examiner* — Brent W Herring
(74) *Attorney, Agent, or Firm* — The Dobrusin Law Firm, P.C.

(57) ABSTRACT

A structural member comprising an integrally formed connector portion on two or more elements for forming the structural member, wherein a first connector portion on a first element is shaped to engage a second connector portion on a second element.

18 Claims, 6 Drawing Sheets

(51) Int. Cl.
*E04C 3/29* (2006.01)
*E04C 3/04* (2006.01)

(52) U.S. Cl.
CPC ................ *E04C 2003/0413* (2013.01); *E04C 2003/0439* (2013.01); *E04C 2003/0465* (2013.01)

(58) Field of Classification Search
CPC ..... E04C 2003/0439; E04C 2003/0465; E04C 2003/0473
USPC ..... 296/187.02; 52/834, 836, 841, 838, 839, 52/843, 844, 845; 206/703
See application file for complete search history.

(56) References Cited

U.S. PATENT DOCUMENTS 3,256,671 A * 6/1966 Handley .................. E04C 3/06 52/844
3,264,141 A * 8/1966 Blaich .................. H01M 50/114 429/185
3,620,402 A * 11/1971 Wentland ........... H01M 50/171 220/555
3,811,956 A * 5/1974 Reinert ............... H01M 50/184 429/185
3,968,561 A * 7/1976 Oakes .................. E06B 3/2675 264/46.7
4,295,181 A * 10/1981 Chang ................... H05K 7/103 361/740
4,412,616 A * 11/1983 Williams ............... B25H 3/022 220/255
4,760,682 A * 8/1988 King ..................... E04B 1/2403 52/844
5,100,015 A * 3/1992 Vanderstuyf ......... B65D 50/045 292/87
5,160,025 A * 11/1992 Greenawald ......... B65D 81/264 206/703
5,293,951 A * 3/1994 Scott ...................... B60R 16/04 180/68.5
5,534,364 A * 7/1996 Watanabe ........... H01M 50/244 429/150
6,040,084 A * 3/2000 Kurasawa ........... H01M 50/141 429/185
6,068,946 A * 5/2000 Zedell, Jr. ........... H01M 50/121 429/96
6,159,260 A * 12/2000 Hammes ................ B01D 46/10 55/497
6,286,281 B1 * 9/2001 Johnson .................. E04H 12/02 52/592.1
6,367,646 B1 * 4/2002 Hoagland ........... H01M 50/267 206/703
6,602,637 B1 * 8/2003 Kurasawa ........... H01M 50/121 429/163
6,846,559 B2 1/2005 Czaplicki et al.
6,923,499 B2 8/2005 Wieber et al.
7,125,461 B2 10/2006 Czaplicki et al.
7,199,165 B2 4/2007 Kassa et al.
7,479,758 B2 * 1/2009 Moon .................. H01M 50/211 429/177
7,521,093 B2 4/2009 Finerman et al.
7,836,989 B2 * 11/2010 Reed ................... H01M 50/227 180/68.5
7,892,396 B2 2/2011 Sheasley
8,117,802 B1 * 2/2012 Kisch ........................ E04C 3/02 52/844
8,236,128 B2 8/2012 Kassa et al.
8,334,055 B2 12/2012 LeGall et al.
8,475,694 B2 7/2013 Kassa et al.
8,702,889 B2 4/2014 Sheasley et al.
8,808,889 B2 * 8/2014 Suzuki .................. H01M 50/30 429/185
9,133,625 B2 * 9/2015 Mingyong .............. E04F 13/07
10,570,258 B2 2/2020 Richardson et al.
11,110,670 B2 9/2021 Richardson et al.
12,066,104 B2 * 8/2024 Gruhler .................. F16J 15/067
2001/0042353 A1 * 11/2001 Honda .................... B29C 44/18 296/187.02
2005/0238955 A1 * 10/2005 Hooke ................ H01M 50/184 29/623.2
2006/0176014 A1 * 8/2006 Moon .................. H01M 50/211 320/112
2009/0004554 A1 * 1/2009 Reed ................... H01M 50/249 180/68.5
2009/0178360 A1 * 7/2009 Teffenhart, Jr. ........... E04C 3/06 52/745.19
2012/0019175 A1 * 1/2012 Suzuki ................ H01M 50/186 29/623.2
2015/0129116 A1 5/2015 Richeton et al.
2018/0036970 A1 2/2018 Chmielewski et al.
2019/0173064 A1 * 6/2019 Lee ..................... H01M 10/625
2020/0144566 A1 * 5/2020 Zeng ................... H01M 50/242
2020/0157293 A1 5/2020 Chmielewski et al.
2021/0053625 A1 2/2021 Richardson
2021/0237377 A1 8/2021 Richardson
2022/0080912 A1 3/2022 Barz
2022/0190420 A1 * 6/2022 Zhang ................. H01M 50/213
2022/0333688 A1 * 10/2022 Gruhler .................. F16J 15/067
2023/0151610 A1 * 5/2023 De Frene ................ E04F 10/00 52/844
2023/0187754 A1 * 6/2023 Underhill ............ H01M 50/204 206/703

FOREIGN PATENT DOCUMENTS

CN 104183799 A * 12/2014 .......... H01M 2/1077
CN 208173658 U * 11/2018
DE 102013200519 A1 7/2014
WO 2020/198139 A1 10/2020
WO 2020/205192 A1 10/2020
WO 2020/214769 A1 10/2020
WO 2021/080917 A1 4/2021

OTHER PUBLICATIONS

Chinese First Office Action dated Oct. 10, 2022, Application No. 202080013092.0.
Chinese Second Office Action dated May 19, 2023, Application No. 202080013092.0.
Brazil Office Action dated Jul. 22, 2025, Application No. BR112021014841-8.

* cited by examiner 14
12

14
14
10
12
14
14
12
12
14
14

14
16
12
14
12

14

10
14
12
12
16
14

10
14
12
12
16

12
14

ATTACHMENT SYSTEMS FOR PULTRUDED, EXTRUDED, AND MOLDED PARTS

FIELD

The present teachings generally relate to structural members, and more particularly, to mechanically connecting one or more elements to form one or more structural members.

BACKGROUND OF THE INVENTION

Various industries utilize structural members as a means for structural support, including building construction, transportation, furniture, appliances, and sporting goods. As a result of this wide usage, there continues to be a need to connect multiple elements (e.g., pieces or members) together to form such structural members and also to connect adjacent structural members.

Further as new manufacturing processes are being utilized to form structural members, there are additional challenges that come with forming members and attaching members to one another. Often, members formed by different manufacturing processes may require connection to one another. There also remains a continued need to minimize steps in the manufacturing process and thus integrally formed connection means are generally preferred to separate connectors.

As a result, it would be beneficial to have integrally formed attachment structures that allow for connection in and among elements for forming structural members even if the elements are formed by different manufacturing methods.

SUMMARY

The present teachings meet one or more of the present needs by providing an integrally formed connector portion on two or more elements for forming a structural member, wherein a first connector portion on a first element is shaped to engage a second connector portion on a second element. The connector portion may be contacted with an adhesive to improve connection between the first and second element.

One or more of the first or second connector portions may include one or more projections. One or more of the first or second connector portions may include one or more openings. The first connector portion may include an indent adapted to engage an extension of the second connector portion. One or more of the first or second connector portions may include a dovetail joint. One or more of the first or second connector portions may include an extension that is substantially linear, arrowhead shaped, t-shaped, u-shaped, v-shaped, circular, oval, trapezoidal, or rectangular. One or more of the first or second connector portions may be formed as a pathway for receiving an extension. One or more of the first or second connector portions may be flexible and may be adapted to flex in order to engage an adjacent connector portion. The structural member may include at least three, at least four, at least five, or even at least six connector portions.

The member may include an adhesive that is substantially free of any contact with one or more of the first and second connector portions. The member may include an adhesive that is in direct contact with one or more of the first and second connector portions. The member may include an adhesive that is activated to adhere, foam, cure or any combination thereof and the adhesive is substantially free of any contact with one or more of the connector portions prior to activation, post-activation, or both. The member may include an adhesive that is activated to adhere, foam, cure or any combination thereof and the adhesive is in contact with one or more of the connector portions prior to activation, post-activation, or both.

One or more of the first element or second element may be pultruded elements. One or more of the first element or second element may be extruded elements. One or more of the first element or second element may be molded elements. One or more of the first element or second element may be injection molded elements. One or more of the first element or second element may be formed by additive manufacturing. One or more of the first element or second element may include an adhesive and the adhesive may be extruded onto the element.

One or more of the first element or second element may form a battery box. One or more of the first element or second element may form a reinforcing structure adapted for location in a cavity. One or more of the first element or second element may form a structural support for a solar panel.

The structural member may include a third element. The member may be substantially free of any separately formed fasteners. The member may be substantially free of any separately formed fasteners for connecting the first element to the second element. The member may include an adhesive comprising an epoxy, an acrylate, a urethane, or some combination thereof. The member may include an adhesive that is activated to adhere, foam, cure or some combination thereof upon exposure to a stimulus. The member may include a two-part adhesive that is activated to adhere, foam, cure or some combination thereof at room temperature. The member may include an adhesive formed as a tape.

The one or more connector portions may include a hook, latch, pin, column, flange, lip, fin, projection, hole, cavity, recess, or a combination thereof. The one or more connector portions may be formed as projections that form an angle with a surface of the member of about 30 degrees or more, about 45 degrees or more, or about 60 degrees or more. The one or more connector portions may be formed as projections that form an angle with a surface of the member of about 135 degrees or less, about 120 degrees or less, or about 105 degrees or less.

DETAILED DESCRIPTION

Figure 1:
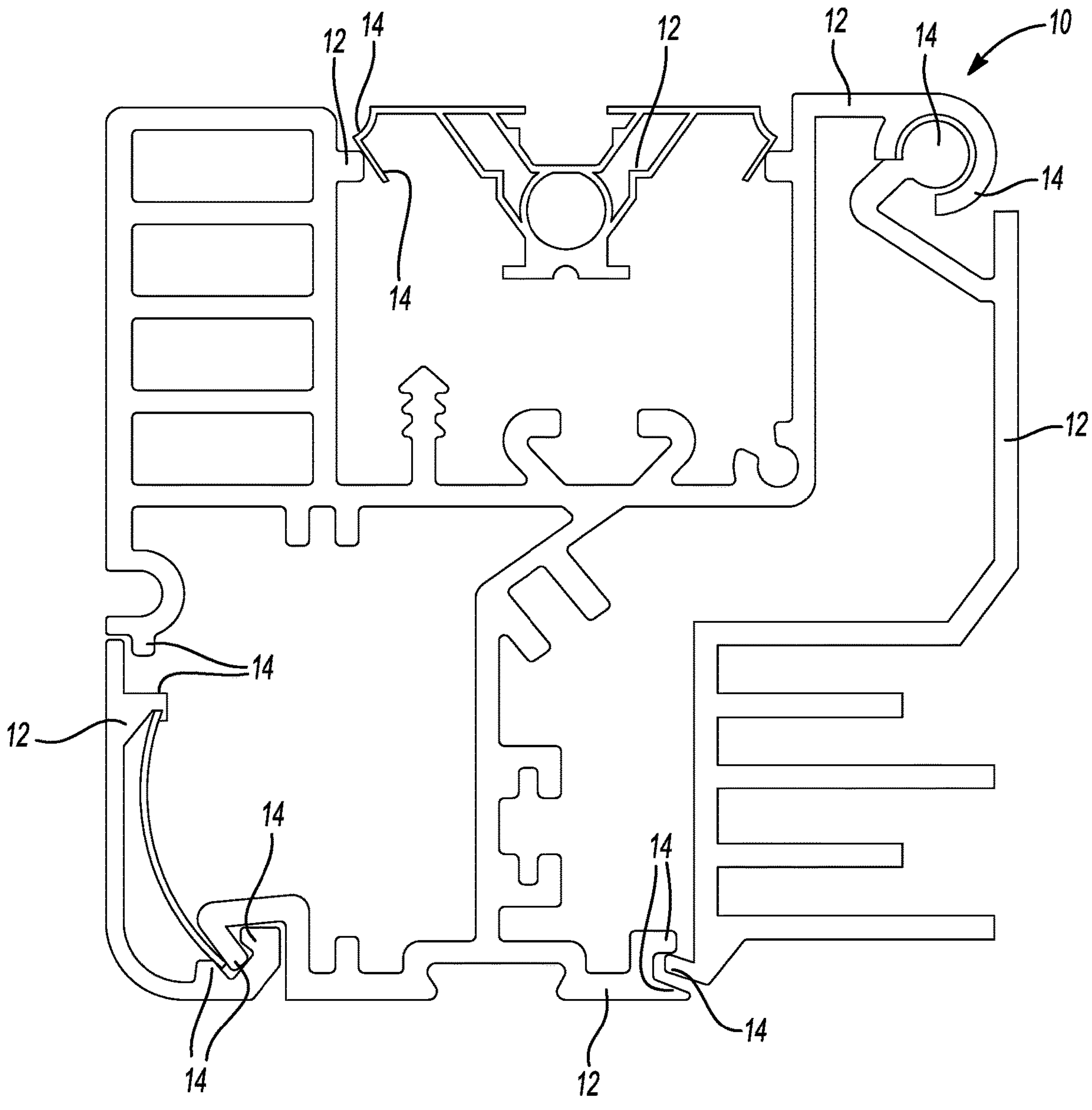
FIG. 1 is a top-down view of a plurality of structural members connected to each other.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/802,448, filed Feb. 7, 2019, the contents of that application being hereby incorporated by reference herein for all purposes.

The teachings herein relate to a structural member. The structural member may be used to form one or more articles of manufacture, which may be configured for one or more industries, such as commercial and/or residential construction, automotive, aeronautical, nautical, transportation, consumer product, or a combination thereof. As an example, the members may be utilized as support structures for solar panels. As another example, the structural member may be configured to reinforce an automotive vehicle, a component of an automotive vehicle, or both. The members may be utilized as battery boxes for electric vehicles. The structural member may reinforce a cavity, hollow member, panel, other structure, or a combination thereof. The structural member may reinforce by improving one or more structural characteristics of an article. The one or more structural characteristics may be strength, stiffness, vibration dampening, sealing, noise absorption, thermal insulation, baffling, or a combination thereof. The structural member may include one or more structurally rigid portions, one or more flexible portions, one or more adhesive portions, one or more connector portions, or a combination thereof.

The structural members may be pultruded, extruded, molded, stamped, hydroformed, or the like. Adjacent structural members that are connected via a connector portion may be formed by the same process or may be formed by different processes.

The structural member may include one or more elements. The one or more elements may be formed as a carrier. The carrier may function to support an adhesive material of the structural member. The carrier may function to reinforce an article of manufacture. The carrier may function as a substrate for the adhesive material of the structural member. The carrier may be structurally rigid. The carrier may be flexible. The carrier may be shaped similar to an adhesive material so that the adhesive material is disposed on a surface of the carrier. The adhesive may be mechanically secured to the carrier and free of secondary fasteners, secondary adhesives, or both. The carrier may include one or more abrasive surfaces to increase friction between the adhesive material and the carrier. The carrier may include one or more holes, one or more cavities, or both. The carrier may be substantially planar or may include one or more contoured surfaces. The carrier may be injection molded, stamped, cast, extruded, pultruded, cut, or a combination thereof. The carrier may be formed from a polymer, metal, fibrous material, composite material, or a combination thereof. The carrier may include one or more layers disposed on each other to form the carrier. For example, the carrier may include a metal layer disposed on a polyamide layer. The carrier may be shaped to mate with a shape of one or more adhesive materials. The carrier be configured to secure the structural member an article of manufacture being reinforced. For example, the carrier may include one or more connector portions that connect the carrier to the article of manufacture or to additional structural members, elements, or carriers (all of which may be considered "elements").

The structural member may be formed by two or more elements that are connected to one another via one or more integrally formed connector portions. The structural members may be connected to one or more additional elements (which may be another structural member) via one or more connector portions. The connector portions may engage adjacent connector portions. The one or more connector portions may include a hook, latch, pin, column, flange, lip, fin, projection, hole, cavity, recess, or a combination thereof.

The connector portions may include one or more projections. The projections may be structurally rigid. The projections may be elastically deformable. The projections may include one or more rigid portions and one or more elastically deformable portions. The projections may be compressible. The projections may include one or more arcuate portions, one or more contoured portions, one or more undulating portions, one or more cavities, one or more holes, one or more curves portions, one or more edges, one or more projections, one or more recesses, or a combination thereof. The projections may be similar or shape or may differ. For example, a first set of projections may be hollow deformable columns while a second set of projections are substantially "T" shaped. The projections may be shaped to mate with a receiving portion of a second element. The projections may extend substantially orthogonal to a surface of the carrier. The projections may extend from a surface of the carrier, adhesive material, or both at an angle other than orthogonal. The projections may form an angle with a surface of the carrier of about 30 degrees or more, about 45 degrees or more, or about 60 degrees or more. The projections may form an angle with a surface of the carrier of about 135 degrees or less, about 120 degrees or less, or about 105 degrees or less. The projections may be positioned anywhere along the carrier.

The connector portion may include a receiving portion, which may be an opening, an indent, a cavity, or the like. The receiving portion may function to secure another connector portion which may include one or more projections. The receiving portion may be any size and shape. The receiving portion may be a hollowed channel of the element. The receiving portion may be defined as any empty space located within the solid thickness of the carrier. The receiving portion may be a chamber, pocket, pouch, crater, or a combination thereof. The receiving portion may be configured to substantially conform around a shape of another connector portion (e.g., the mating portion). For example, the mating portion may be bulbous in shape and the receiving portion may have a substantially hollow bulbous shape to abut an exterior surface of the mating portion. The connector portion may include a clamshell structure that wraps around an adjacent connector portion. The connector portion may be formed as "arms" or walls of an extruded or pultruded section. The walls can be reheated after primary forming, and thereafter portions can be bent or reshaped around or into mating parts.

The structural member may be any size and shape desired for an application. The structural member may vary in thickness, width, length, height, or a combination thereof. The structural member may include one or more arcuate portions, one or more contoured portions, one or more undulating portions, one or more cavities, one or more holes, one or more curved portions, one or more edges, one or more projections, one or more recesses, or a combination thereof. The structural member may have a substantially uniform size and shape or may have a varying size and shape. For example, the structural member may vary in size and shape between different segments of the structural member. The structural member may be substantially shaped to mate with an article being reinforced by the structural member. For example, the structural member may be substantially "C" shaped to be inserted into a substantially "C" shaped channel of a pillar of an automotive vehicle. The structural member may be substantially "A" shaped, "C" shaped, "D" shaped, "P" shaped, "G" shaped, "V" shaped, "L" shaped, "U" shaped, or a combination thereof. The structural member may have one or more arms, one or more fingers, one or more bends, one or more flanges, or a combination thereof.

The adhesive material (if present) may function to adhere the structural member to an article of manufacture so that the structural member may reinforce the article of manufacture. The adhesive material may function to assist in connecting one or more elements to form the structural member.

The adhesive material may be any adhesive material that forms a bond between the structural member and the carrier, article being reinforced, or both. The adhesive material may be heat activatable, activated by an activating agent, or both. The adhesive material may be expandable upon activation. The adhesive material may be dry to the touch, non-tacky, or both prior to activation. The adhesive material may be room stable. The adhesive material may include an adhesive polymeric material (e.g., epoxy resin or the like). The adhesive material may include one or more of the following: an epoxy resin; a flexibilizer; a phenoxy resin; an impact modifier; a blowing agent; a curing agent; a filler; or a combination thereof. The adhesive may be a one-part or two-part adhesive. The adhesive may be epoxy-based, acrylate-based, or urethane-based. If the adhesive material is expandable or foamable, the adhesive material may expand to a volume greater than its volume in the unexpanded state (e.g., at least 5% greater, at least 20% greater or even possibly at least 50% greater). The volumetric expansion may be about 400% or less, about 300% or less, or about 200% or less relative to the original unexpanded volume. The volumetric expansion may be about 50% or more, about 100% or more, or about 150% or more relative to the original unexpanded volume. Alternatively, the volume of the adhesive material may be less after activation due to curing (e.g., cross-linking) for foamed and/or unfoamed versions of the adhesive material. A plurality of adhesive materials may be disposed on one or more surfaces of the carrier. Examples of adhesive materials may be found in U.S. Pat. Nos. 6,846,559; 6,923,499; 7,125,461; 7,199,165; 7,521,093; 7,892,396; 8,236,128; 8,334,055; 8,475,694; and 8,702,889, all of which are incorporated by reference herein for all purposes.

The connector portions may snap together. The connector portions may slide together. The material for forming the connector portions may be aluminum, steel, magnesium, polyethylene, or other thermoplastics. The material for forming the connector portions may be composite materials including epoxy or urethane resins with glass, basalt or carbon fiber strands or fabric mesh.

Turning now to the figures, FIGS. 1-12*a* and 12*b* illustrate views of one or more structural members 10. The structural member 10 includes a plurality of elements 12, each including one or more connector portions 14. An adhesive material 16 may be located in contact with an element 12.

Figures 2, 3, 4:
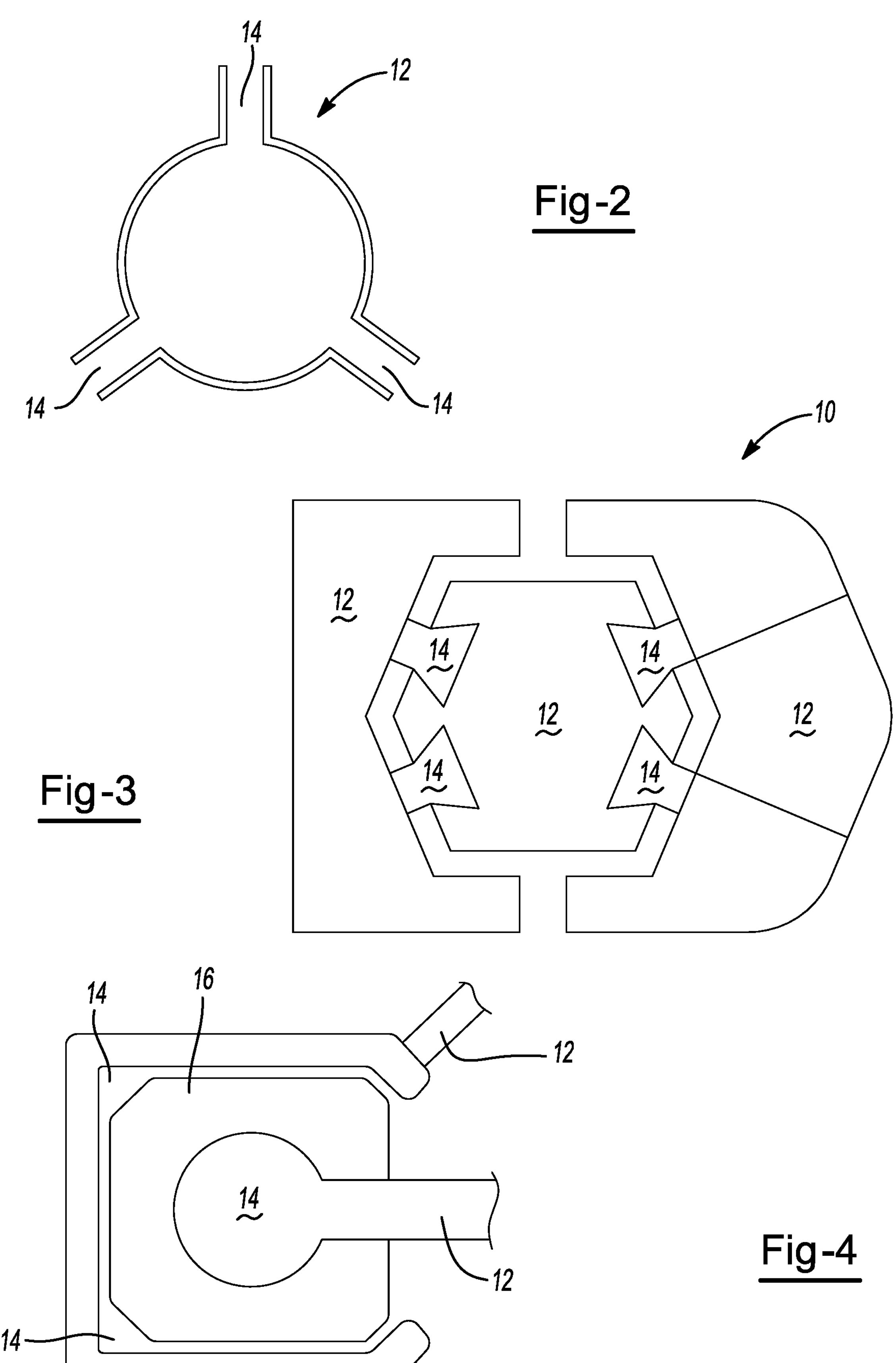
FIG. 2 is a top-down view of a connector portion of a structural member.
FIG. 3 is a top-down view of two connector portions of two elements for forming a structural member.
FIG. 4 is a cross sectional view of two connector portions including and adhesive therebetween.
Figure 5:
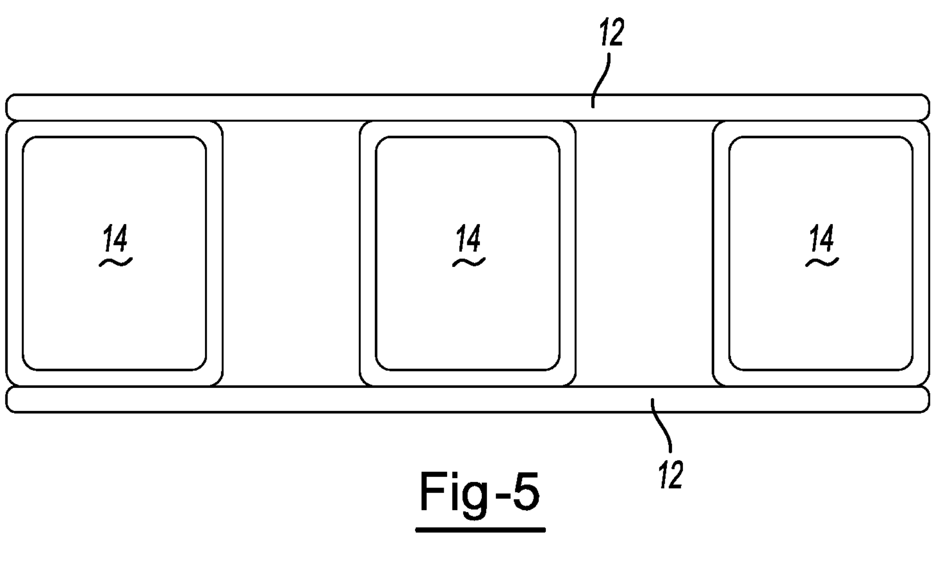
FIG. 5 is a cross-sectional view of multiple elements for forming a structural member.
Figure 6:
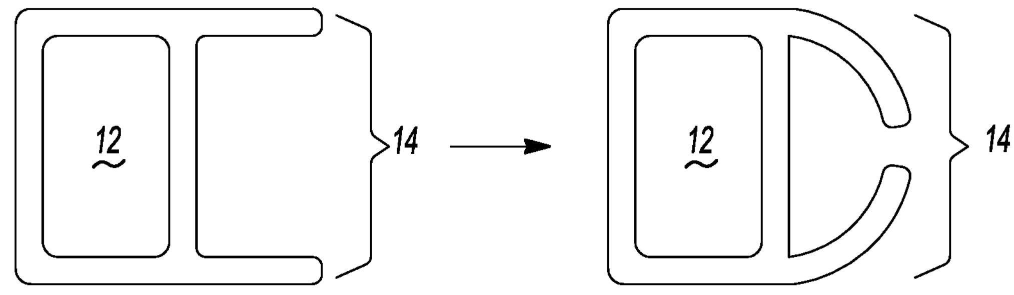
FIG. 6 is a cross-sectional view of a connector portion that changes shape.
Figure 7:
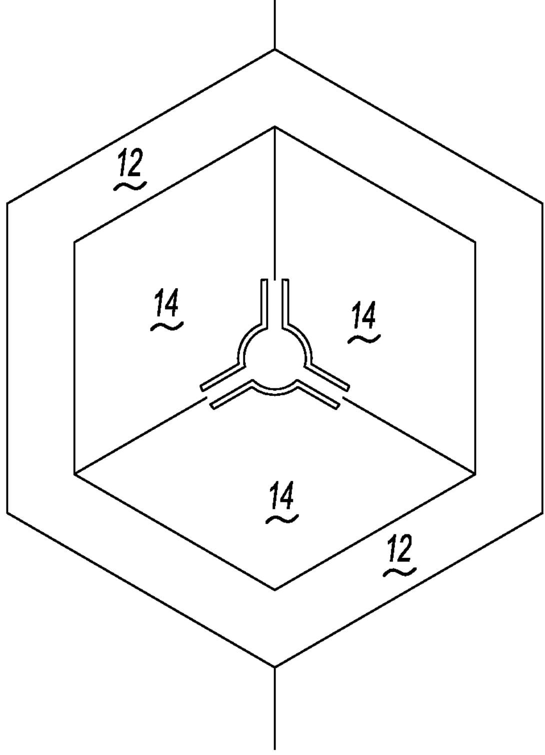
FIG. 7 is a cross-sectional view of multiple connector portions.
Figure 8:
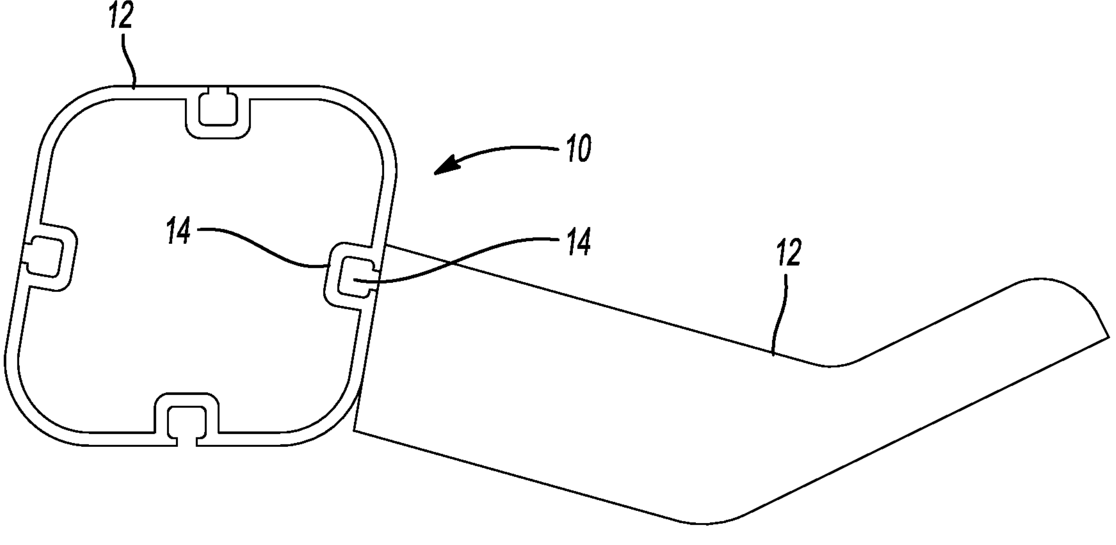
FIG. 8 is a cross-sectional view of a connector portion and associated member.
Figure 9:
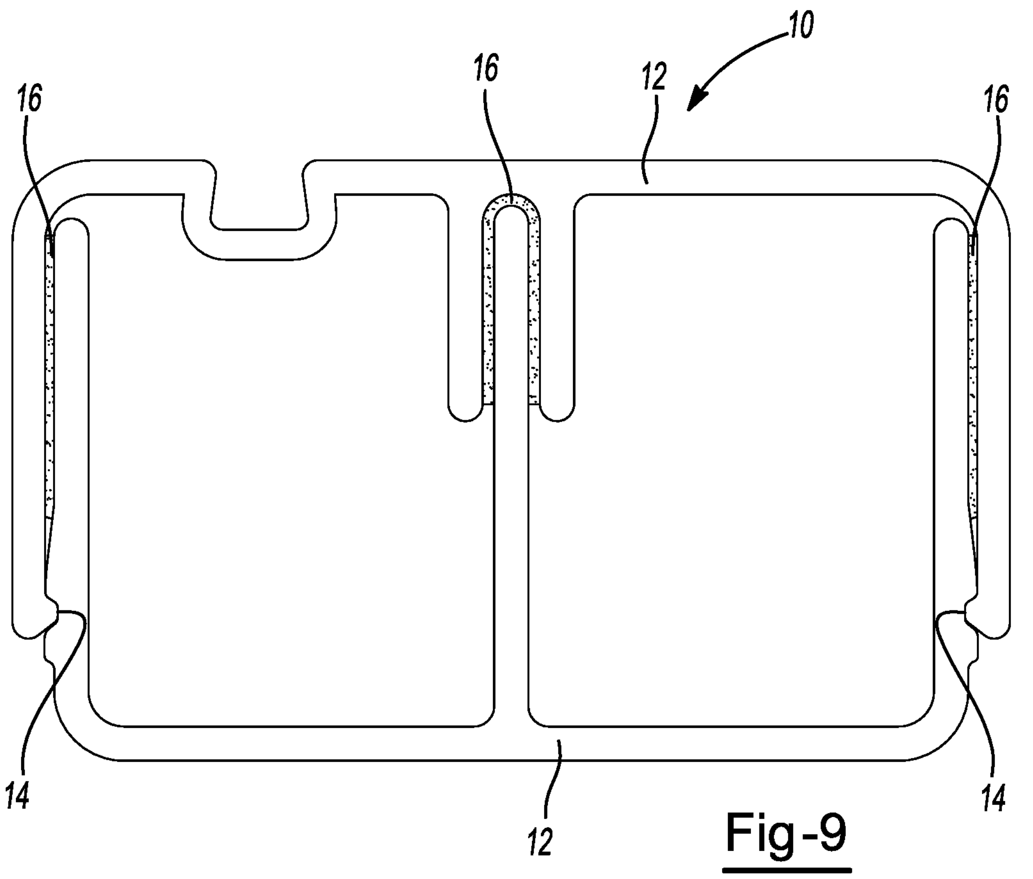
FIG. 9 is a cross-sectional view of two connected members.
Figures 10, 11:
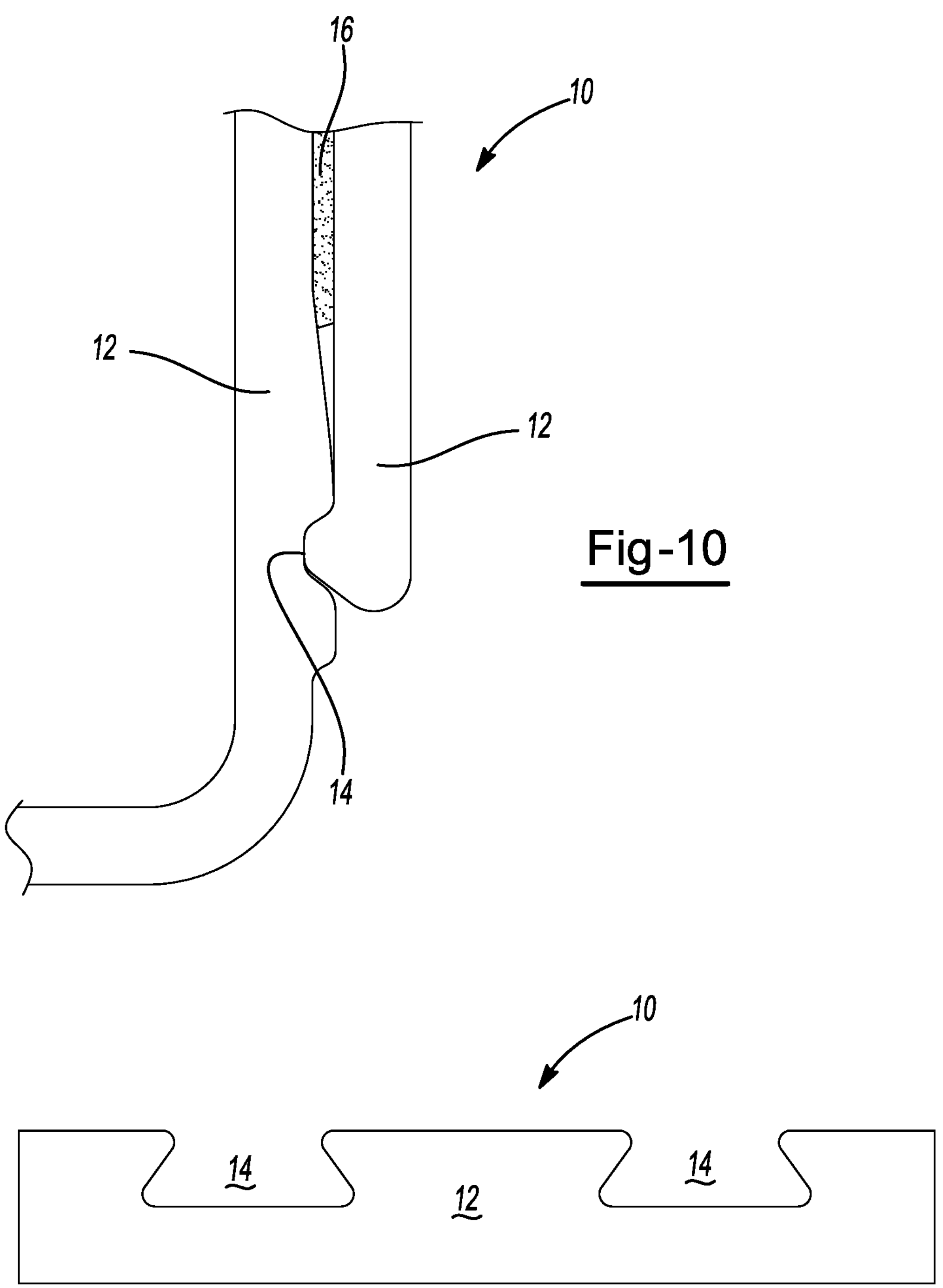
FIG. 10 is a cross-sectional view of a connector portion of the members of FIG. 9.
FIG. 11 is a cross-sectional view of two connector portions.
Figures 12A, 12B:
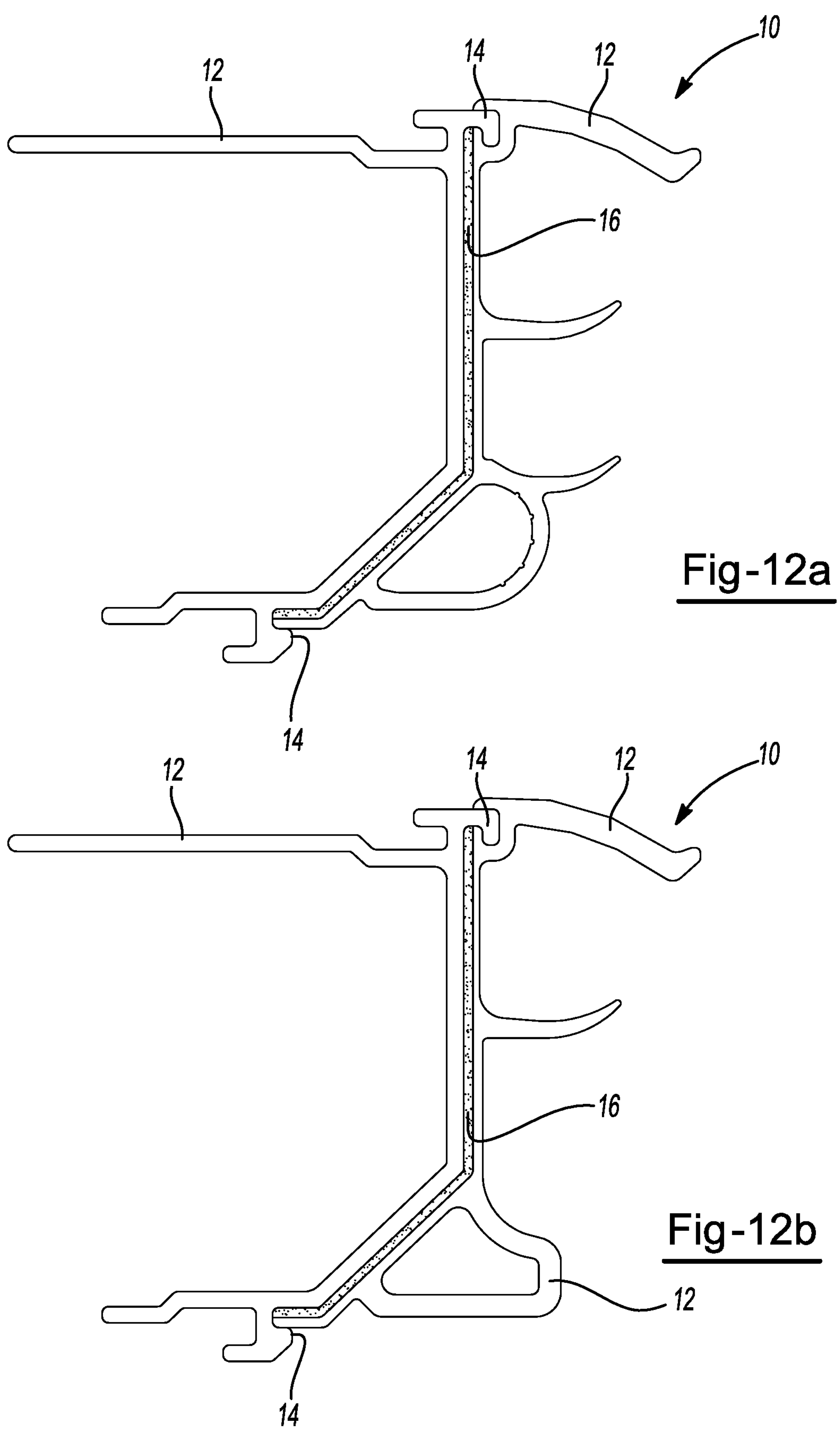
FIG. 12*a* is a cross-sectional view of two interconnected members.
FIG. 12*b* is a cross-sectional view of two interconnected members.

In specific reference to FIG. 1, a variety of differently shaped and integrally formed connector portions 14 are shown for connecting elements 12. The elements 12 shown are free of any adhesive. In FIG. 2, a circular element 12 is shown having 13 distinct connector portions 14. Each connector portion is adapted to engage a connector portion of an adjacent element (not shown. In FIG. 3, three elements 12 are shown having connector portions 14 for engaging the connector portions 14 of one or two of the other elements 12. In FIG. 4, an adhesive layer 16 is shown between first and second connector portions 14. In FIG. 5, three connector portions connect two elements 12. In FIG. 6, a flexible connector portion 14 is shown in both an unflexed and flexed position. In FIG. 7, three connector portions are shown that are adapted to connect a first element 12 to three adjacent elements (not shown). In FIG. 8, an element 12 is shown including four connector portions 14 where one connector portion is shown engaged with a second element 12. In FIG. 9, two interconnected elements 12 are shown having both connector portions 14 and an adhesive 16 for achieving connection. In FIG. 10, an enlarged image of the connector portion 14 of FIG. 9 is shown where the adhesive 16 does not contact the connector portion 14. In FIG. 11, an element 12 is shown including multiple dovetail connector portions 14. In FIGS. 12*a* and 12*b*, a c-shaped pultruded element 12 is shown including an adhesive 16 and multiple connector portions 14 for connecting to an extruded element 12.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms.

These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

What is claimed is:

1. A structural member for forming an automotive vehicle battery box comprising:

an integrally formed connector portion located on two or more elements for forming the structural member and maintaining the two or more elements in connection; and an adhesive material that is adapted to foam located on a portion of the connector portion;

wherein the connector portion includes a first connector portion on a first element shaped to include a projection and to engage a second connector portion on a second element, wherein the second connector portion is shaped as an indent to receive the projection, and wherein the projection abuts and lies in direct contact with the indent;

wherein the projection forms an angle with a surface of the member of about 30 degrees or more;

wherein the adhesive material is located on or adjacent to the projection, on or adjacent to the indent, or on or adjacent to both the projection and the indent; and wherein the member is substantially free of any separately formed fasteners.

2. The structural member of claim 1, wherein one or more of the first or second connector portions include one or more openings.

3. The structural member of claim 1, wherein one or more of the first or second connector portions includes a dovetail joint.

4. The structural member of claim 1, wherein the projection is substantially linear, arrowhead shaped, t-shaped, u-shaped, v-shaped, circular, oval, trapezoidal, or rectangular.

5. The structural member of claim 1, wherein the indent is formed as a pathway for receiving the projection.

6. The structural member of claim 1, wherein one or more of the first or second connector portions are flexible and adapted to flex.

7. The structural member of claim 1, wherein the structural member includes at least three connector portions.

8. The structural member of claim 1, wherein the adhesive material is substantially free of any contact with one or more of the first and second connector portions.

9. The structural member of claim 8, wherein the adhesive material is adapted to be activated to adhere, foam, cure, or any combination thereof; and wherein the adhesive material is substantially free of any contact with one or more of the connector portions prior to activation, post-activation, or both.

10. The structural member of claim 1, wherein the adhesive material is in direct contact with one or more of the first and second connector portions.

11. The structural member of claim 10, wherein the adhesive material is adapted to be activated to adhere, foam, cure, or any combination thereof; and wherein the adhesive material is in contact with one or more of the connector portions prior to activation, post-activation, or both.

12. The structural member of claim 1, wherein one or more of the first element or second element are pultruded elements, extruded elements, molded elements, or some combination thereof.

13. The structural member of claim 1, wherein one or more of the first element or second element are formed by additive manufacturing.

14. The structural member of claim 1, wherein the adhesive material is extruded onto the two or more elements.

15. The structural member of claim 1, wherein the adhesive material comprises an epoxy, an acrylate, a urethane, or some combination thereof.

16. The structural member of claim 1, wherein the adhesive material is a two-part adhesive that is activated to adhere, foam, cure, or some combination thereof at room temperature.

17. The structural member of claim 1, wherein the adhesive material is formed as a tape.

18. The structural member of claim 1, wherein the one or more connection portions may include a hook, latch, pin, column, flange, lip, fin, projection, hole, cavity, recess, or combination thereof.

* * * * *